INVENTOR.
Chester N. Winningstad
BY
Buckhorn, Cheatham & Blore
ATTORNEYS

INVENTOR.
Chester N. Winningstad
BY
Buckhorn, Cheatham & Blore
ATTORNEYS

United States Patent Office 3,123,781
Patented Mar. 3, 1964

3,123,781
SIGNAL ENERGY TAKE OFF DEVICE
Chester N. Winningstad, Portland, Oreg., assignor to Tektronix, Inc., Beaverton, Oreg., a corporation of Oregon
Filed Nov. 7, 1960, Ser. No. 67,679
2 Claims. (Cl. 333—9)

This invention relates to a signal energy take off device and more particularly to a device for extracting from an input or feed through transmission line a usable small amount of any signal energy being transmitted along such line in a manner which causes very little discontinuity in the transmission line and, therefore, very little reflection of signal energy in such transmission line and also very little distortion of such signal, and in a manner which delivers such signal energy through an output transmission line to provide an output signal voltage having substantially the same waveform as that of the signal voltage passing along the feed through transmission line.

In many cases, it is desired to extract from a transmission line a portion of any signal energy traveling along said line. For example, in a cathode ray oscilloscope, such extracted signal energy can be employed to actuate a trigger circuit which initiates the operation of a sweep circuit in the oscilloscope while the remaining signal energy travels along a delaying transmission line before being employed to produce an indication on the screen of the oscilloscope. In prior devices resistive isolation involving resistance in series with the take off or output line has been employed to keep the reflections in the feed through transmission line small, thus resulting in extremely poor efficiency of signal energy delivery to the output line because of losses in such resistance.

In accordance with the present invention, an extremely efficient signal energy take off device is provided. Even though a small reflection is produced in the feed through line, substantially all of the signal energy which is extracted from the signal in such line is delivered to the output line. In such device, a short gap is provided in one of the conductors of an input or feed through transmission line, for example, in the outer conductor of a coaxial cable, and this gap is bridged with a plurality of connecting transmission lines connected in parallel across the gap so that the impedance produced by such connecting transmission lines across such gaps is small relative to the characteristic impedance of the feed through transmission line. One or more transformers or coils having bifilar windings and preferably employing annular cores of low loss magnetic material having high permeability are employed to electrically isolate the other ends of the plurality of connecting transmission lines from each other so that they can be connected in series or in a series parallel arrangement to an output transmission line to thereby match the characteristic impedance of an output transmission line. The opposite sides of the gap in the feed through transmission line can be electrically isolated in a similar manner from each other so that a signal voltage appears across such gap by placing an annular core of magnetic material around such line adjacent such gap. Such core is placed on the side of the gap which it is desired to isolate from ground or other common conductor and, if both sides of the gap require such isolation, then such a core is employed on both sides of the gap.

The gap in the conductor of the feed through transmission line is made short relative to the spacing of the conductors of such transmission line, and in the case of a coaxial transmission line, the gap in the outer conductor is made short relative to the diameter of the outer conductor of such line. As stated above, the resulting parallel characteristic impedance of the transmission lines connected across said gap should be small relative to the characteristic impedance of the feed through transmission line and by making the connecting transmission lines of the same effective electrical length so that the increments of signal energy all arrive at the output line at the same time, an output signal is produced in the output transmission line which is similar in waveform to the signal traveling along the feed through transmission line. In any event a usable small amount of signal energy over a wide range of frequencies including extremely high frequency signal energy can be extracted from the feed through transmission line with very little effect on the continuous character of such transmission line and very little loss of signal energy.

It is therefore an object of the present invention to provide an improved signal energy take off device for efficiently extracting a small amount of signal energy from a transmission line without deleteriously affecting the transmission of such signal along such transmission line.

Another object of the invention is to provide a signal energy take off device in which a short gap is provided in one conductor of a feed through transmission line, and a plurality of connecting transmission lines are connected in parallel across such gap and also connected at least partly in series to an output transmission line so as to at least approximately match the impedance of said output transmission line.

A further object of the invention is to provide a signal energy take off device capable of being operated at extremely high frequencies in which a plurality of connecting transmission lines have one of their ends connected in parallel across a gap in one conductor of an input transmission line and have their other ends at least partly connected in series to an output transmission line and in which such opposite ends of at least certain of the connecting transmission lines are electrically isolated from each other in order to provide for such series connection.

Other objects and advantages of the invention will appear in the following description of preferred embodiments thereof given in connection with the attached drawings of which:

Figure 1:
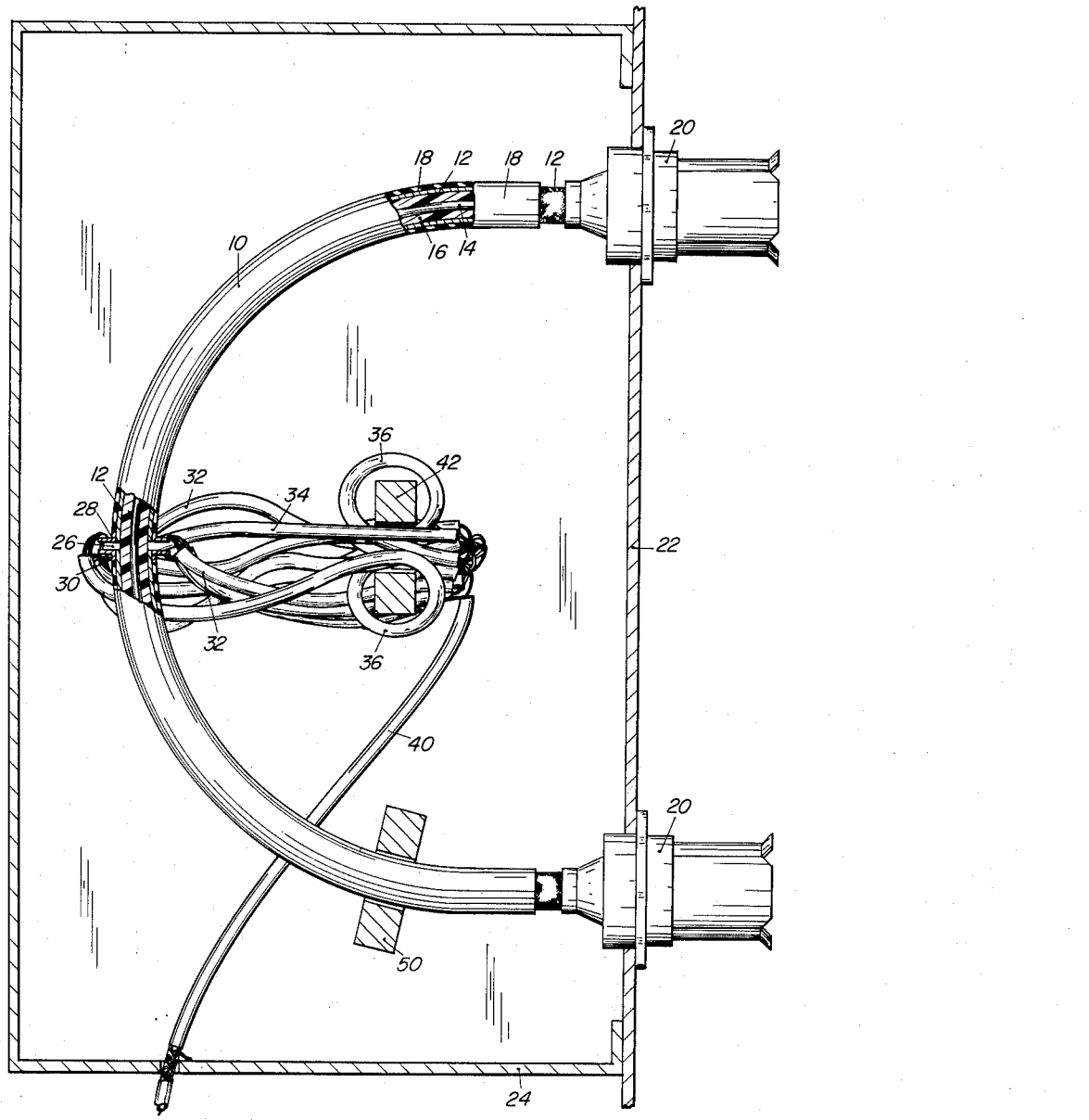
FIG. 1 is a side elevation of a device in accordance with the present invention with parts broken away to show internal structure and with a supporting structure therefor shown in vertical section.

Referring more particularly to the drawings, the signal energy take off device of FIG. 1 includes a feed through coaxial cable 10 which may form a portion of an input transmission line to any desired device, for example an oscilloscope. Such cable includes an outer conductor 12, and inner conductor 14, a tubular insulating member 16 between the inner and outer conductors and an outer insulating sheath 18. The cable 10 is shown as being curved longitudinally of the cable into a semicircle and as having its opposite end connected to suitable detachable coaxial cable connectors 20 mounted in a panel 22, the take off device being surrounded by a protective casing 24.

The coaxial cable 10 has its outer insulating sheath 18 removed for a short distance adjacent its central portion in FIG. 1 and also a small portion of the outer conductor 12 is removed to provide an annular gap 26 therein, which is short relative to the diameter of the outer conductor 12. A pair of annular metal members 28 and 30 surround the ends of the outer conductor 12 adjacent the gap 26 so as to make electrical contact with the ends of the outer conductor 12 adjacent such gap 26. Such annular members 28 and 30 may be of sheet metal and each may be applied in two or more pieces and soldered to the ends of the outer conductor 12. Such conductor elements 28 and 30 are spaced from each other to provide a continuation of the annular gap 26 in the outer conductor 12 of the cable 10.

Figure 2:
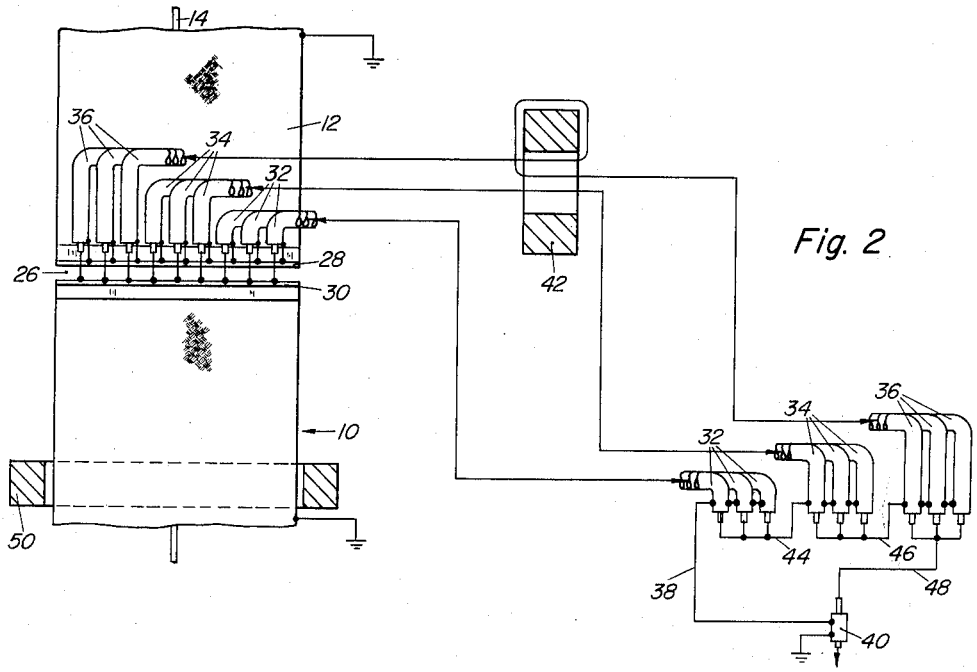
FIG. 2 is a diagrammatic view illustrating the circuit of the device of FIG. 1.

A plurality of connecting coaxial cables 32, 34 and 36 are connected in parallel across the gap provided by conducting elements 28 and 30, the actual connection being illustrated in FIG. 2, in which the outer conductor 12 of the coaxial cable 10 has been shown in developed form and also the two conducting elements 28 and 30 connected to the ends of the outer conductor 12 on opposite sides of the gap 26 have been shown in developed form. The cables 32, 34 and 36 in FIG. 2 are arranged in groups of three, there being nine cables altogether. The cables 32 form one group, while the cables 34 form a second group and the cables 36 form a third group. As also indicated in FIG. 2, the connecting cables 32 have their outer conductors at their ends remote from the gap 26 connected in parallel to a conductor 38 which is also connected to the outer conductor of an output coaxial cable 40. The connecting coaxial cables 34 are grouped together and are all passed in the same direction once through the central aperture of an annular core 42 of magnetic material and then have their outer conductors at their ends remote from the gap 26 connected in parallel to a conductor 44 which is also connected to the inner conductors of the cables 32 so as to connect such inner conductors in parallel. The cables 36 are also grouped together and are passed twice through the central aperture of the core 42 in the same direction as the cables 34 and then have their outer conductors at their end remote from the gap 26 connected in parallel to a conductor 46 which is also connected to the inner conductors of the cables 34 so as to connect such inner conductors in parallel. The inner conductors of the cables 36 are connected in parallel to a conductor 48 which is connected to the inner conductor of the output coaxial cable 40.

The annular magnetic core 42 is made of a magnetic material having relatively high permeability and having low eddy current losses and low hysteresis losses so as to be usable at high frequencies or with pulses having short rise times. Suitable cores are available commercially and are usually referred to as ferrite cores. So far as the conductors 34 and 36 are concerned, the passing of these conductors through the central aperture of the core 42 is equivalent to providing a bifilar transformer or choke coil winding for the two conductors of the transmission line so that the opposite ends of such cables are effectively electrically isolated from each other to thus enable series connections of the ends of the cables which are connected in parallel at their other ends. Thus the group of parallel cables 32 which do not pass through the core 42 may be connected in series with the group of parallel cables 34 which pass once through the core and these two groups of cables can likewise be connected in series with the group of parallel cables 36 which passed twice through the core 42.

The feed through or input coaxial cable 10 has a magnetic core 50 surrounding such cable on the side of the gap 26 in the outer conductor of the cable 10 which has such outer conductor of the cable 10 connected to the inner conductors of the cables 32, 34 and 36. The outer conductors 12 of cable 10 will ordinarily be grounded to the panel 22 on opposite sides of the gap 26 and the magnetic core 50, which may be of the same type as the magnetic cores 42 previously described, is necessary to isolate the opposite ends of such outer conductor 12 on the opposite sides of the gap 26 from each other and to isolate the inner conductors of the cables 32, 34 and 36 from ground. No such core is necessary on the opposite side of the gap 26, since the outer conductors of the cables 32, 34 and 36 need not be isolated from ground and the same is true of the outer conductor 12 of the cable 10 on such side of the gap. The cores 42 and 50 should be of sufficient size to effectively provide the required electrical isolation. The necessary cross-sectional area of such cores can be determined from their known magnetic characteristics.

As a specific example, the coaxial cable 10 may have a characteristic impedance of 125 ohms. If the cables 32, 34 and 36 each have 50 ohms characteristic impedance and are connected in parallel, this parallel characteristic impedance is approximately 5.6 ohms, thus providing an impedance across the gap 26 in the outer conductor 12 of the coaxial cable 10 which is small relative to the characteristic impedance of the cable 10. At the other end of the connecting cables 32, 34 and 36, each of the three groups of cables are connected in parallel to produce for each group a parallel characteristic impedance of 16.7 ohms and connecting the three groups in series provides a resultant series-parallel characteristic impedance of 50 ohms, which matches an output cable 40 having a characteristic impedance of 50 ohms.

In the device of FIGS. 1 and 2, the voltage across the gap is approximately 4.4% of the voltage traveling along the feed through cable 10 so that the voltage delivered to the output cable 40 is approximately 13.2% of the signal voltage traveling along such feed through cable. Such output voltage is obtained at a loss of only about 4.4% of the signal energy traveling along the cable 10 with no more than about 2.2% voltage reflection in the cable 10 so that approximately 97.8% of the signal voltage continues along the line 10.

Figure 3:
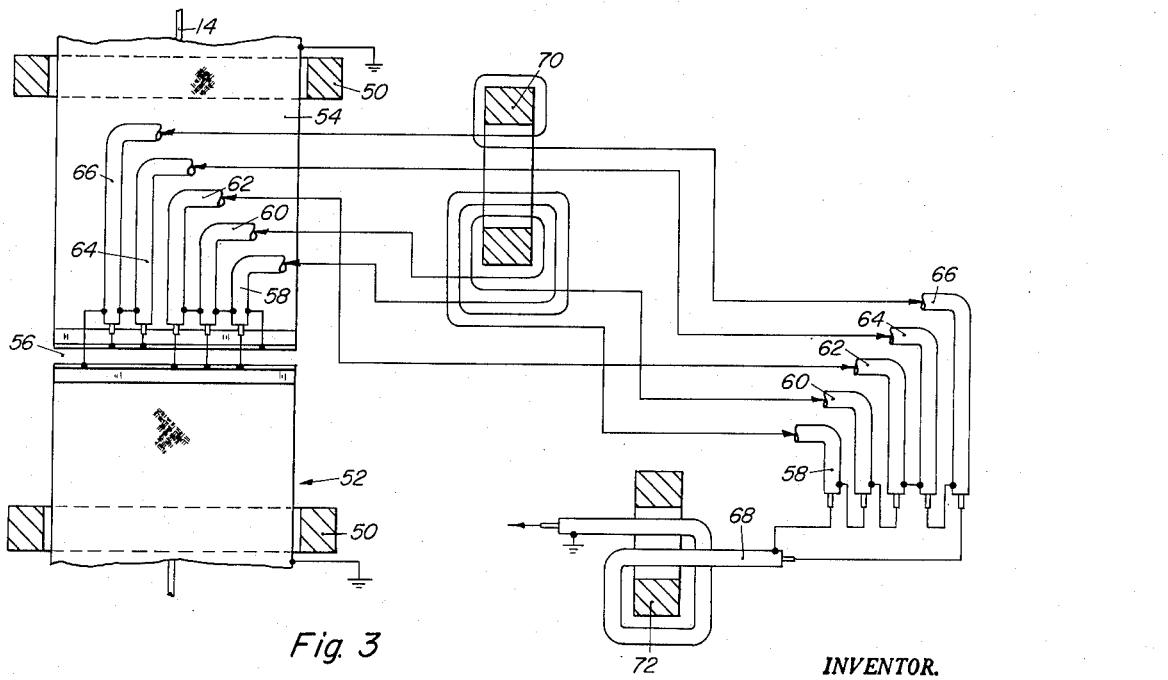
FIG. 3 is a view similar to FIG. 2, showing a modified circuit of a device similar to that shown in FIG. 1.

A modified circuit for a signal take off device similar to that shown in FIG. 1 is illustrated in FIG. 3. In FIG. 3, a feed through or input coaxial cable 52 is employed which may, for example, have a characteristic impedance of 50 ohms. Such cable has a portion of its outer conductor removed to provide an annular gap 56. Five connecting coaxial cables 58, 60, 62, 64 and 66 are connected in parallel across the gap 56 and if such connecting cables each have a characteristic impedance of 10 ohms, a parallel characteristic impedance of 2 ohms across the gap 56 is provided. In the circuit shown, the other ends of the cables 58, 60, 62, 64 and 66 are effectively connected in series so that their 10 ohms characteristic impedance adds up to resultant series 50-ohm characteristic impedance which matches a 50-ohm output coaxial line 68.

An isolating magnetic core 70 is provided for electrically isolating the ends of the connecting cables 58, 60, 64 and 66. The connecting cable 62 does not pass through such core. The connecting cable 64 passes once through such core in one direction and connecting cable 66 passes through such core twice in the same direction. Connecting cable 60 passes through the core 70 once in the opposite direction and connecting cable 58 passes through the core 70 twice in the same direction as connecting cable 60. The connecting cables are thus connected in two groups. One of such groups, consisting of cables 64 and 66, has its two conductors connected in parallel across the gap 56 in one direction and the other group of three cables 58, 60 and 62 has the two conductors of each cable connected in parallel across the gap 56 in the opposite direction. Except for the cable 62, which does not pass through the core 70, the cables of each of the two groups pass through the core in opposite directions and the two groups of cables are each connected together in series but in opposite directions at their ends adjacent the end of the output cable 68. The signal voltages and also their characteristic impedances therefor add respectively at the latter mentioned ends of the connecting cables to provide an output voltage which is approximately five times that across the gap 56 and to provide an impedance match for such output cable. Since both the inner and outer conductors of output cable 68 are removed from ground electrically by the circuit described, such cable should pass once or more times through another magnetic core 72, which may be of the type similar to the magnetic core 70. The outer conductor of the cable 68 may then be connected to ground. Also the input or feed through cable 52 should have cores 50 surrounding such cable on opposite sides of the gap 56 for the purpose explained with reference to FIGS. 1 and 2. A core 50 on each side of the gap is desirable in the circuit of FIG. 3 to electrically isolate from ground the ends of all of the conductors of the connecting cables 58, 60, 62, 64 and 66 which are adjacent the gap. All of such connecting cables should have the same effective electrical length.

With feed through and output coaxial cables 52 and 68 respectively each having a characteristic impedance of 50 ohms and connecting cables each having a characteristic impedance of 10 ohms, the voltage across the gap is approximately 4% of the voltage traveling along the feed through cable 52, so that the voltage delivered to the output cable 68 is approximately 20% of the signal voltage traveling along the feed through cable 52. This output voltage is obtained at a loss of about 4.0% of the signal energy traveling along the cable 52 and with approximately 2% voltage reflection in such cable so that approximately 98% of the signal voltage continues along the line 52.

It will be apparent that the invention is not limited to the values of characteristic impedance of the input and output cables illustrated in FIGS. 2 and 3, nor to the number of connecting cables given having the characteristic impedances given. In general, a combination of connecting cables should be selected so that such cables connected in parallel provide a resulting parallel characteristic impedance which is small relative to the characteristic impedance of the feed through cable. Such connecting cables should be capable of being connected at their other ends in either a series or a series parallel combination which will provide a resultant characteristic impedance matching that of the output cable.

As an aid in selecting a suitable cable arrangement, an impedance $\Delta Z$ to be connected across the gap should be selected so that the maximum permissible reflection coefficient $\rho$ is not exceeded where $$\rho = \frac{\Delta Z}{2Z_0 + \Delta Z}$$

and where $Z_0$ is the characteristic impedance of the feed through transmission line. The impedance connected across the gap should also be selected so that the ratio $$\frac{m}{n} = \sqrt{\frac{\Delta Z}{Z_L}}$$

has integral values of $m$ and $n$ where $Z_L$ is the load impedance, namely, the characteristic impedance of the output transmission lines. It will be found that $m$ is the number of connecting cables connected in series across the gap in the input cable (1 in each of the examples given above) and $n$ is the number of cables or the number of parallel connected groups of such cables connected in series at the output (3 in the example of FIG. 2 and 5 in the example of FIG. 3). Also the impedance of each connecting cable or parallel connected groups of such cables should be equal to $$\frac{m}{n} Z_L$$

While a single annular magnetic core for all of the connecting cables between the input and output lines can be employed, it is apparent that separate cores for each of such cables can be employed. Although, the take off devices illustrated are particularly adaptable for use with coaxial lines, it is entirely possible to produce a similar result with other types of transmission lines.

I claim:
1. A signal voltage take off device comprising a coaxial cable including an outer tubular conductor and a central conductor, said outer conductor having an annular gap therein providing an impedance across said gap which is small relative to the characteristic impedance of said cable, a plurality of connecting coaxial cables connected in parallel across said gap at one of their ends, said connecting cables having characteristic impedances providing a resulting parallel characteristic impedance across said gap which is small relative to the characteristic impedance of said feed through cable, an output coaxial cable, the other ends of said connecting cables being connected at least partly in series across one end of said output cable to provide a resultant characteristic impedance approximating the characteristic impedance of said output cable, and means for electrically isolating the opposite ends of at least certain of said connecting cables to provide for connecting said one ends in parallel and said other ends at least partly in series, said means including an annular core of magnetic material through which said certain connecting cables are passed, said connecting cables all having the same effective length and different ones of said certain connecting cables being passed through said core a different number of times.

2. A signal voltage take off device comprising a feed through coaxial cable including an outer tubular conductor and a central conductor, said outer conductor having an annular gap therein which is short relative to the diameter of said cable, a plurality of connecting coaxial cables connected in parallel across said gap at one of their ends, said connecting cables having characteristic impedances providing a resulting parallel characteristic impedance across said gap which is small relative to the characteristic impedance of said feed through cable, an output coaxial cable, the other ends of said connecting cables being connected in series across one end of said output cable to provide a total series characteristic impedance approximating the characteristic impedance of said output cable, and means for electrically isolating the opposite ends of at least certain of said connecting cables to provide for connecting said one ends in parallel and said other ends in series, said connecting cables all having the same effective electrical length between said gap and said output cable, the last named means including an annular core of magnetic material through which certain of said connecting cables are passed in one direction through said core different numbers of times for each connecting cable and others of said connecting cables are passed in the other direction through said core different numbers of times.

References Cited in the file of this patent
UNITED STATES PATENTS
2,368,694     Watts _____ Feb. 6, 1945

FOREIGN PATENTS
1,185,860     France _____ Feb. 16, 1959

OTHER REFERENCES
"Electronic Engineering," vol. 27, No. 332, October 1955.